Aug. 19, 1969   F. P. MILLER   3,461,487
APPARATUS FOR PELLETIZING FINELY DIVIDED SOLIDS
Filed Dec. 6, 1966   3 Sheets-Sheet 1

INVENTOR
FRANCIS P. MILLER

BY L. DAVID TRAPNELL
ATTORNEY

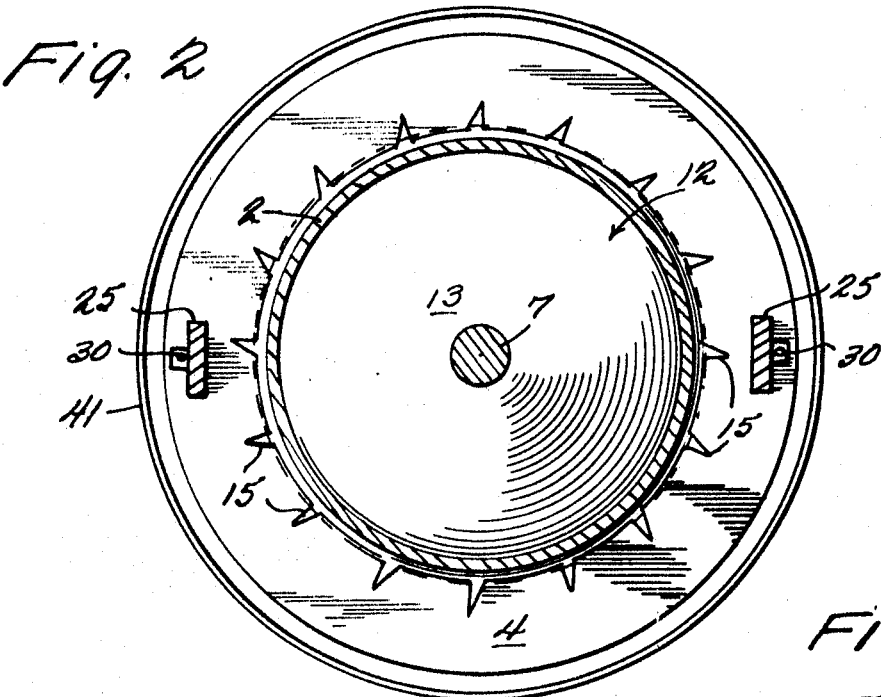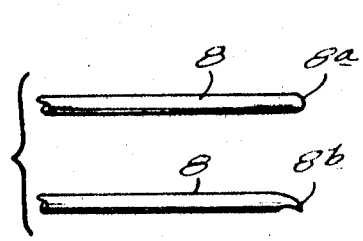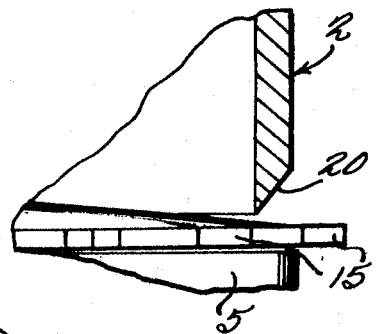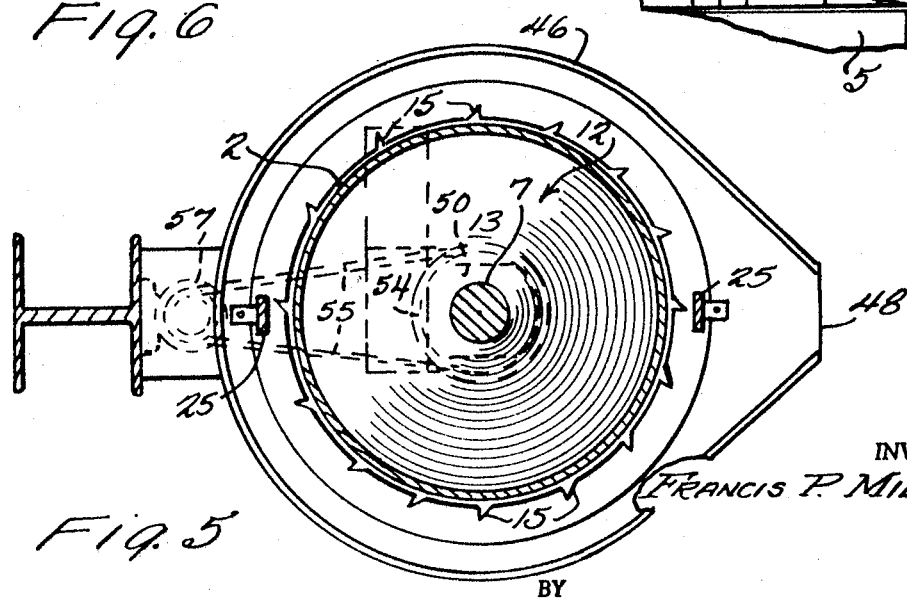

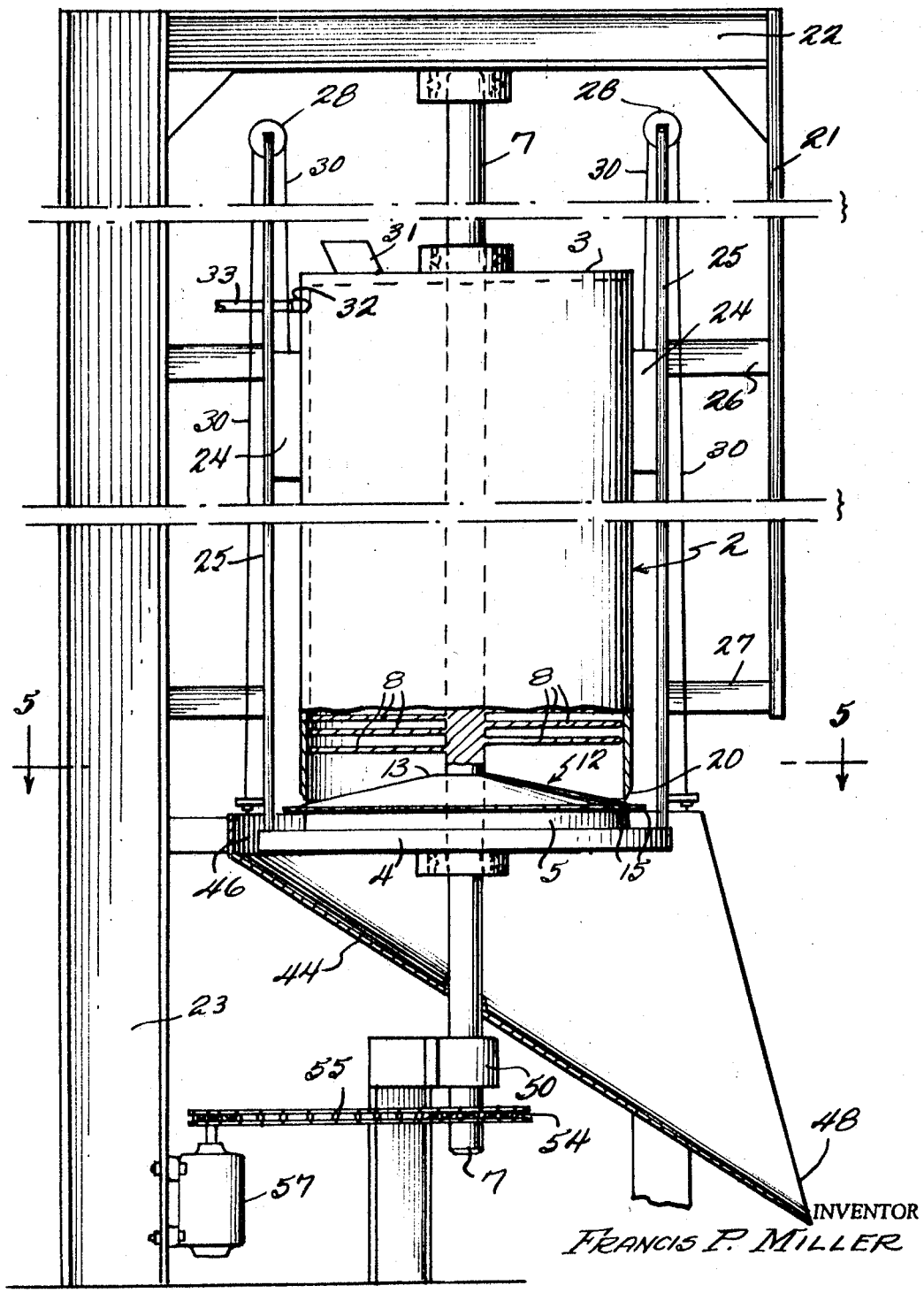

United States Patent Office 3,461,487
Patented Aug. 19, 1969

3,461,487
APPARATUS FOR PELLETIZING FINELY
DIVIDED SOLIDS
Francis P. Miller, Houston, Tex., assignor to Continental Carbon Company, Houston, Tex., a corporation of Delaware
Filed Dec. 6, 1966, Ser. No. 599,634
Int. Cl. B29b 1/03; B29c 23/00
U.S. Cl. 18—1     5 Claims This invention relates to the pelletizing of finely-divided or particulate materials, such as carbon black, which are widely used for numerous industrial purposes including the manufacture of rubber compositions.

It is, of course, well-known that, as manufactured, carbon black is in a fine state of subdivision, which is undesirable for a number of reasons; including handling, shipping; storing; high susceptibility to dissemination into the atmosphere with consequent discoloration of adjacent objects.

Accordingly, numerous methods have been utilized to process the carbon black in the loose state as recovered from production in order to make it more compact and not as fluffy or dusty.

Most of these attempts, as exemplified in the prior art patents, involve agglomerating or pelletizing the loose and finely-divided carbon black in a cylindrical shell or drum which is closed at both ends. In the wet process for pelletizing carbon black, the drum is provided with an interiorly disposed axially extending rotatable shaft carrying radially extending agitating pins, means for introducing water or other suitable wetting agent into the interior of the drum, means for feeding the loose and finely divided carbon black into one end of said drum, and means for removing wet carbon black pellets from the other end thereof.

Most frequently the cylindrical pelletizing shell or drum is disposed horizontally, or substantially horizontally; and after the wet carbon black pellets are removed therefrom they are usually passed through an adjacently disposed drying drum or other suitable drying apparatus.

The immediately aforementioned method is continuous and variations in the steps thereof, and/or the apparatus employed therein, control, to some extent, the quality, size and uniformity of the pellets produced thereby.

The present invention seeks to provide an apparatus for pelletizing carbon black or similar finely-divided or particulate materials, whereby pellets are produced which are markedly superior in quality, size and uniformity than those which are produced in accordance with prior art practices.

Another object is the attainment of the foregoing ends in a manner which is consistent, rapid, inexpensive and easily practiced by those possessing ordinary skill in the art.

Still another object is to provide an apparatus for accomplishing the foregoing objectives which is durable in service and relatively inexpensive to manufacture, install and maintain.

The foregoing and other objects and advantages of the invention will become more apparent after referring to the following description to be read in conjunction with the annexed drawings, wherein like reference numerals designate like parts and wherein:

FIGURE 2 is a plan view taken adjacent the bottom of the pelletizing shell or drum and on the line 2—2 of FIGURE 1;

FIGURE 3 is a fragmentary elevational view, on an enlarged scale, of a portion of the apparatus of FIGURE 1 illustrating the radial outlet for the formed pellets at the bottom of the cylindrical pelletizing shell or drum;

FIGURE 4 is an elevational view, similar to that of FIGURE 1, but illustrating a form of apparatus which embodies a modified means at the bottom of the pelletizing shell or drum for handling the pellets being discharged therefrom;

FIGURE 5 is a plan view taken on the line 5—5 of FIGURE 4; and

FIGURE 6 is a plan view of a modified form of pelletizing pin to be carried by the rotary shaft within the vertically disposed cylindrical pelletizing shell or drum.

Figure 1:
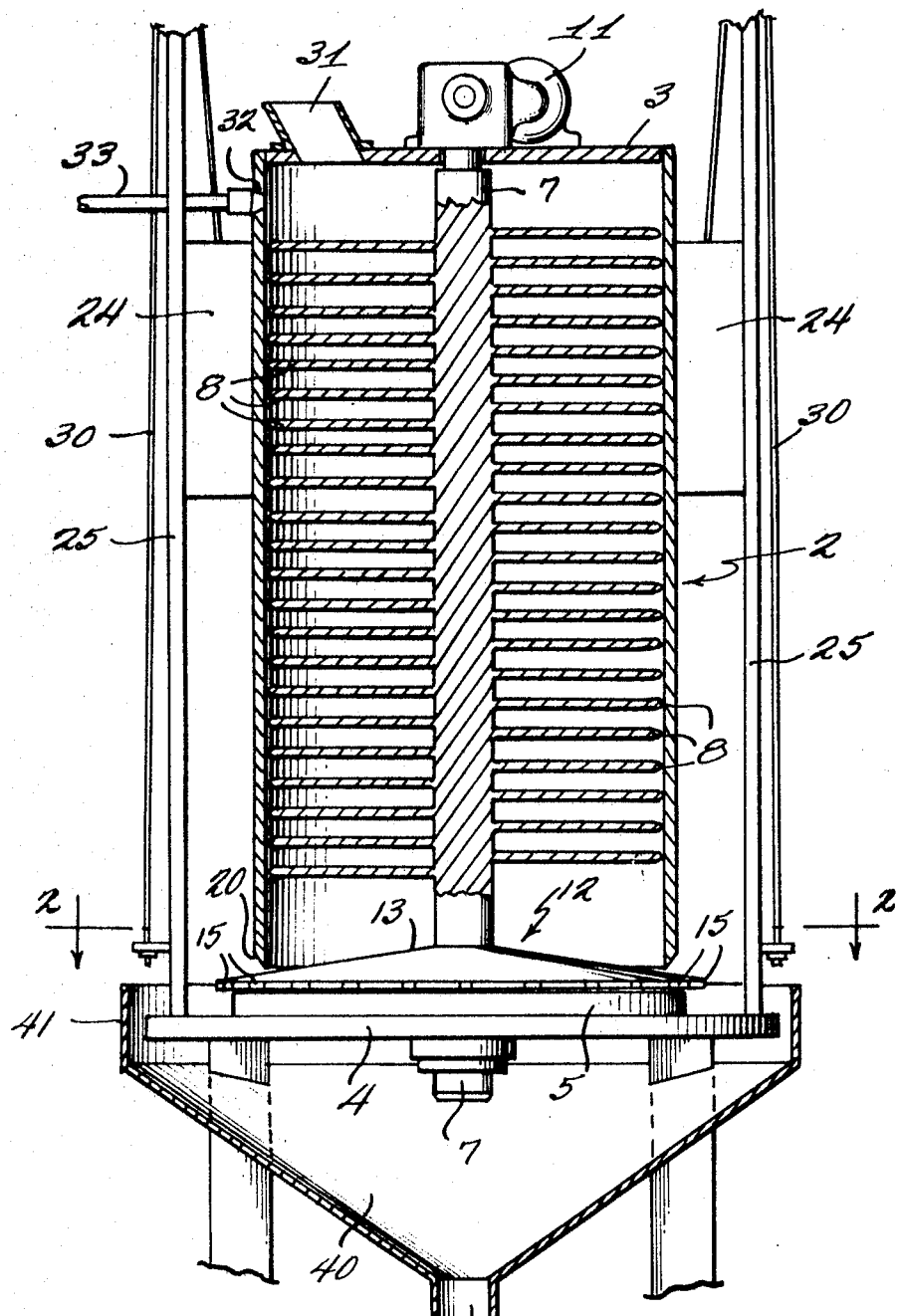
FIGURE 1 is a fragmentary elevational view of a form of apparatus which embodies the teachings of the invention, the same including a vertically disposed cylindrical pelletizing shell or drum.

Referring more particularly to the drawings, the numeral 2 designates a vertically disposed cylindrical shell or drum having a smooth interior surface and provided with a suitably secured top plate 3 of conventional design. A suitable shell or drum 2 would be a twenty inch seamless pipe with smooth interior to provide maintenance of clearance for pelletizing pins hereinbelow.

Disposed adjacent, but slightly below the bottom of the vertically disposed cylindrical pelletizing shell, is a bottom plate 4 of substantially increased diameter.

The bottom plate 4 may acceptably have a planar undersurface. However, its upper surface is provided with a raised disc-shaped portion 5 of a diameter which is materially less than that of the remainder of the bottom plate 4 but slightly greater than the outside diameter of the cylindrical pelletizing shell 2.

Disposed in, and projecting axially from both ends of, the cylindrical pelletizing shell 2 is a rotatable shaft 7 which may, for example, be a solid shaft of suitable diameter or a hollow shaft of cold drawn, low carbon seamless mechanical tubing approximately four inches in diameter having a wall thickness of about one inch.

This vertically disposed rotatable shaft 7 is provided with a series of lateral or horizontal pelletizing pins 8 which extend into rather close proximity to the interior surface of the cylindrical pelletizing shell 2; for example one-sixteenth of an inch.

These pelletizing pins 8 may be ⅝ inch in diameter composed of type 316 stainless steel with ends shaped as shown, either rounded or sharpened, and installed on the rotatable shaft 7 to extend outwardly 180° apart with alternate pins 22½° apart to form two spiral arrangements.

The direction of rotation of the rotatable shaft 7 is such that the spiral rotation of the pins 8 will push the finely-divided material to be pelletized upwardly in the pelletizing shell 2 which will allow the smaller pellets of higher density to proceed to the bottom thereof; as will be described more fully hereinafter.

The rotatable shaft 7, as shown in FIGURE 1 of the drawings, extends substantially above the top plate 3 and at its upper end is connected to a suitably mounted driving motor 11.

The apparatus of the invention includes an outlet disc 12 adjacent the bottom of the cylindrical pelletizing shell 2 for the aforementioned smaller pellets of higher density. This outlet disc 12 which preferably possesses a flat bottom surface is provided with a relatively thick centrally apertured portion 13 which is welded or otherwise suitably secured to the rotatable shaft 7 at a position which is immediately above the raised disc-shaped portion 5 of the circular bottom plate 4 of increased diameter; and said outlet disc tapers in thickness toward its periphery where it is provided with a series of relatively thin outwardly extending prongs 15.

As shown in FIGURE 2 of the drawings, these prongs 15 are, when viewed in plan, substantially triangular in shape; and the outer and pointed ends thereof project outwardly beyond both the lower extremity of the cylindrical pelletizing shell 2 and the periphery of the raised disc-shaped portion 5 of the circular bottom plate 4 but not beyond the periphery of the latter.

Sixteen of these substantially triangular relatively thin outwardly extending prongs 15 are shown in FIGURE 2; but it will be understood that the number, size and shape thereof may be varied to best suit all of the factors of the particular installation.

Referring to FIGURE 3, the periphery of the lower extremity of the cylindrical pelletizing shell 2 is preferably beveled inwardly, as shown at 20, whereby the opening at the inside wall of the shell is smaller and progressively increases toward the outside wall thereof, to facilitate discharge of the wet pellets.

As previously mentioned, the bottom of the outlet disc 12 is preferably flat, thus permitting minimum clearance between it and the upper surface of the raised disc-shaped portions of lesser diameter on the circular bottom plate 4, and the connection between the centrally apertured portion of said outlet disc and the rotatable shaft 7 should be such as to prevent the leakage of the material from the pelletizing shell 2.

In order to provide for the adjustment of the size, i.e. width, of the pellet discharge opening, and also to permit the repair and replacement of the agitating pins 8 and the cleaning of the interior of the cylindrical pelletizing shell 2, the latter is mounted for lonigtudinal displacement with respect to the rotatable shaft 7 and the outlet disc 12 and bottom plate 14.

An acceptable means for enabling the longitudinal displacement of the cylindrical pelletizing shell 2 is shown in the drawings as comprising a pair of longitudinally extending and relatively narrow guides 24 which are adapted to be affixed, as by welding to diametrically opposite areas on the exterior surface of the pelletizing shell; the said guides being maintained in position by means of retaining strips 25.

The retaining strips 25 are rigidly affixed to support members 26 and 27 which are in turn affixed to frame members 21, 22 and 23. In FIGURE 4 the guide-retaining strips 25 are illustrated as being adjacent the upper surface of the peripheral portion of the bottom plate 4 which extends outwardly beyond the periphery of the raised disc-shaped portion 5, however, strips 25 may be terminated at any point below support members 27.

The upper ends of the guide-retaining strips 25 carry pulleys 28 (FIGURE 4) having grooves which face the axis of the rotatable shaft 7. A flexible cable 30 is trained around each of the grooved pulleys 28 with one end thereof connected to the adjacent guide 24; in which case said guides are secured to the outer surface of the cylindrical pelletizing shell 2 but are relatively movable with respect to guide-retaining strips 25. Conversely, the aforementioned ends of the flexible cable 30 may be directly connected to the exterior of either the cylindrical pelletizing shell or its top plate 3; and the guides 24 secured to the guide-retaining strips 25 but free from attachment to the cylindrical pelletizing shell.

Whichever of the immediately aforementioned alternative structures is adopted, the raising of the inner vertical runs of the flexible cable 30 will result in the raising or longitudinal movement of the cylindrical pelletizing shell 2 away from the outlet disc 12 and lower end plate 4 to whatever extent is desired.

In order to achieve this objective with the construction illustrated, it is, of course, necessary that the top plate 3 be slidable with respect to the rotatable shaft 7.

As shown in FIGURE 1, the top plate 3 is provided with an inlet opening 31 for the loose carbon black or other finely-divided material to be pelletized; and a suitable opening 32 is provided in the sidewall of the cylindrical pelletizing shell 2 adjacent the said material inlet opening 31 for the introduction of water or other wetting agent supplied through a conduit 33. Preferably the water etc. is introduced to the interior of the cylindrical pelletizing shell 2 in a flat fan-type spray pattern which is perpendicular to the rotatable shaft 7.

The supply of water, or other suitable wetting agent, through the conduit 33 is automatically regulated wih respect to the quantity and nature of the finely-divided material being acted upon; for example, by means of an ammeter (not shown) connected with the motor 11 which drives the rotatable shaft 7. In this way, there is prevented the excessive input of water to the cylindrical pelletizing shell, and consequent choking or sluggish condition therewithin.

According to the embodiment of FIGURE 1 of the drawings wherein the motor 11 is disposed atop or adjacent the upper end of the rotatable shaft 7, an inverted frusto-conical collection bin 40 is positioned immediately beneath the bottom plate 4 with the upper portion 41 thereof so constructed and arranged as to receive the formed wet pellets which are moved outwardly over the outlet disc 12 and its thin triangular prongs 15 and through the space between the lower end of the cylindrical pelletizing shell 2 and the adjacent portion of the upper surface of the bottom plate 4.

The formed wet pellets are discharged from the lower end of the inverted frusto-conical collection bin 40 through a centrally disposed opening 42 in the bottom thereof; and preferably transferred immediately thereafter to a drying drum or other suitable drying apparatus (not shown).

In FIGURE 4 of the drawings there is shown a modified driving means for the rotatable shaft 7 together with a modified means for collecting the formed wet pellets as they are discharged from the lower end of the cylindrical pelletizing shell 2. According to FIGURE 4, a wet pellet collection trough 44 is disposed beneath the bottom plate 4 with its upper end 46 surrounding both the periphery of the outlet disc 12 and the lower end of the cylindrical pelletizing shell 2; as in the case of the frusto-conical collection bin 40 of FIGURE 1. However, the lower end of the collection trough 44 extends both downwardly and laterally with respect to the bottom plate 4, as indicated at 48. Also the lower end of the rotatable shaft 7 is mounted on a supported bearing 50 which may be disposed either within or outside of the wet pellet collection trough 44, as desired. In either case, the lower end of the rotatable shaft 7 extends downwardly through and projects from the bottom of the wet pellet collection trough 44 and has affixed thereto a chain or pulley 54 which is driven, through a suitable driving connection 55, by an adjacently disposed motor 57.

In FIGURE 6, there is shown a pair of agitating pins 8 (as carried by the rotatable shaft 7), one of said pins being provided with a pointed outer end 8a and the other with an outer end which is beveled, as indicated at 8b, with the flattened surface of the bevel in parallelism with the rotatable shaft 7. The beveled end 8b tends to prevent the formation of any cake on the inner surface of the cylindrical pelletizing shell 2.

As the mixture of carbon black (or other finely-divided material to be treated) and water falls by gravity against the radially rotating agitating pins 8 the pelletizing action takes place in the area about the ends of the said pins and the closely adjacent interior surface of the cylindrical pelletizing shell 2. This results in agglomeration and movement of the formed wet pellets to the lower portion of the pelletizing shell against the upwardly exerted forces of the helical movement of the pins until the formed wet pellets are of such size as to reach the lower portion of the pelletizing shell, contact the upper surface of the outlet disc 12 and move outwardly thereover into contact with the discharge prongs 15; whereupon they are rapidly moved outwardly beneath the lower beveled end 20 of the pelletizing shell and into the collection bin 40, collection trough 44, or other desired instrumentality.

While the cylindrical pelletizing shell 2 is, for illustrative purposes, shown and described as vertically disposed, it will be understood that any angular inclination with respect to the vertical 90° may be utilized, provided it is adequate to attain the herinbefore described downward gravity movement of the particles being agglomerated.

Any suitable means may be utilized to frame and/or support the various elements of the apparatus of the invention; but as such neither these nor the hereinbefore described means for providing and regulating the spray of the wetting agent form part of the present invention and accordingly the structural details thereof are not shown or described herein.

Having described my invention hereinbefore, what I claim as new and desire to secure by Letters Patent is:

1. Apparatus for pelletizing finely-divided particulate materials comprising, in combination, a vertically inclined normally stationary cyindrical pellet-forming shell; a closure plate secured to the upper end of said shell; means for permitting the introduction of the material to be pelletized to the interior of said cylindrical pellet-forming shell adjacent the upper end thereof; means for permitting the introduction of a wetting agent to the upper portion of the interior of said shell; a closure plate disposed adjacent to, but spaced from, the lower end of said shell; a rotatable shaft journalled in said closure plates and extending axially of said shell; a plurality of agitating pins extending outwardly from said rotatable shaft toward the interior surface of said shell in a helical pattern and being separated from each pin by standard longitudinal spacing and angular disposition; and a disc of smaller diameter disposed immediately above the closure plate adjacent the lower end of said cylindrical pellet-forming shell; the periphery of said disc extending into close adjacency with respect to the space between the lower end of said cylindrical pellet-forming shell and the closure plate which is adjacent thereto.

2. The combination of claim 1 wherein the cylindrical pellet-forming shell is longitudinally adjustable with respect to the rotatable shaft whereby the width of the peripheral opening between the lower end of said shell and the upper surface of the adjacent closure plate may be varied.

3. The combination of claim 1 together with a series of prongs extending from the periphery of the disc into the peripheral opening between the lower end of the cylindrical pellet-forming shell and the upper surface of the adjacent closure plate.

4. The combination of claim 1 wherein the thickness of the disc immediately above the closure plate adjacent the lower end of the cylindrical pellet-forming shell tapers outwardly.

5. The combination of claim 1 wherein the undersurface of the disc and the immediately adjacent portion of the closure plate therebeneath are substantially flat.

References Cited

UNITED STATES PATENTS

| 2,139,585 | 12/1938 | Hunter. |
| 3,277,520 | 10/1966 | Nakahara. |
| 3,326,642 | 6/1967 | Ruble. |
| 3,353,208 | 11/1967 | Fergus. |

FOREIGN PATENTS

| 176,833 | 11/1953 | Austria. |

WILLIAM J. STEPHENSON, Primary Examiner